(No Model.) 3 Sheets—Sheet 1.

G. P. SALTENBERER.

MACHINE FOR SHARPENING AND GUMMING SAWS.

No. 374,758. Patented Dec. 13, 1887.

WITNESSES:
Fred G. Dieterich
Leon C. Kennon

INVENTOR:
G. P. Saltenberer
BY Munn & Co.
ATTORNEYS.

(No Model.) 3 Sheets—Sheet 2.

G. P. SALTENBERER.
MACHINE FOR SHARPENING AND GUMMING SAWS.

No. 374,758. Patented Dec. 13, 1887.

WITNESSES:
Fred G. Dieterich
Leon P. Kemon

INVENTOR:
G. P. Saltenberer
BY Munn & Co.
ATTORNEYS.

(No Model.) 3 Sheets—Sheet 3.
G. P. SALTENBERER.
MACHINE FOR SHARPENING AND GUMMING SAWS.
No. 374,758. Patented Dec. 13, 1887.
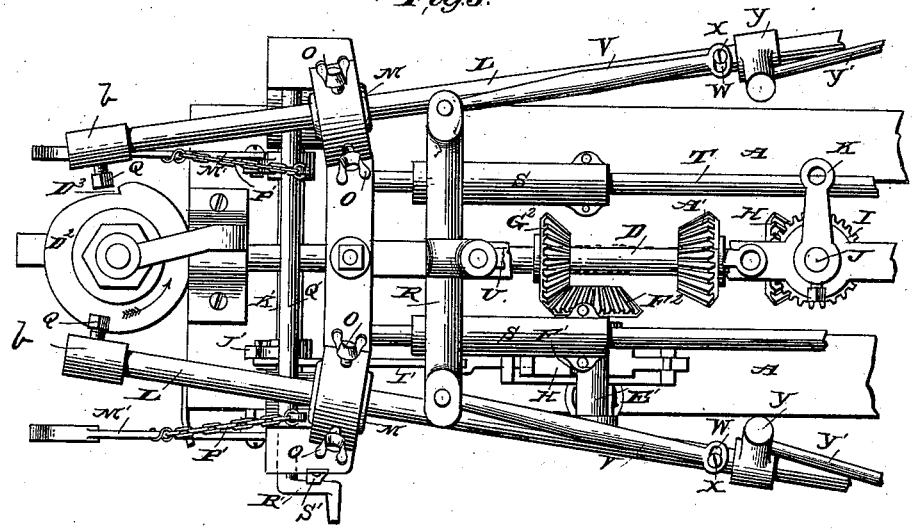
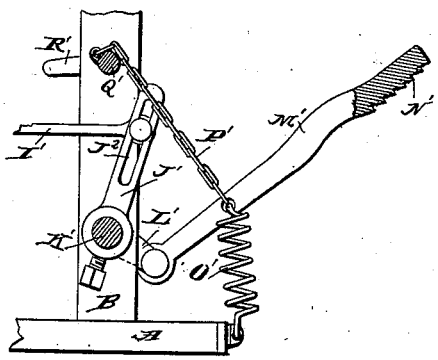
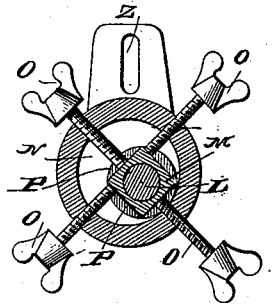
WITNESSES:
INVENTOR:
BY
ATTORNEYS.

UNITED STATES PATENT OFFICE.

GEORGE P. SALTENBERER, OF HAMBURG, ARKANSAS.

MACHINE FOR SHARPENING AND GUMMING SAWS.

SPECIFICATION forming part of Letters Patent No. 374,758, dated December 13, 1887.

Application filed March 28, 1887. Serial No. 232,784. (No model.)

*To all whom it may concern:*

Be it known that I, GEORGE P. SALTENBERER, of Hamburg, in the county of Ashley and State of Arkansas, have invented a new and useful Improvement in Saw Sharpeners and Gummers, of which the following is a specification.

My invention consists in an improved saw sharpener and gummer for gin-saws, which will be hereinafter fully described and claimed, and which is simple and strong in construction, can be adjusted in a few moments to operate either as a sharpener or gummer, is exceedingly efficient when used for either purpose, and effects a great saving in time and labor.

Figure 1:
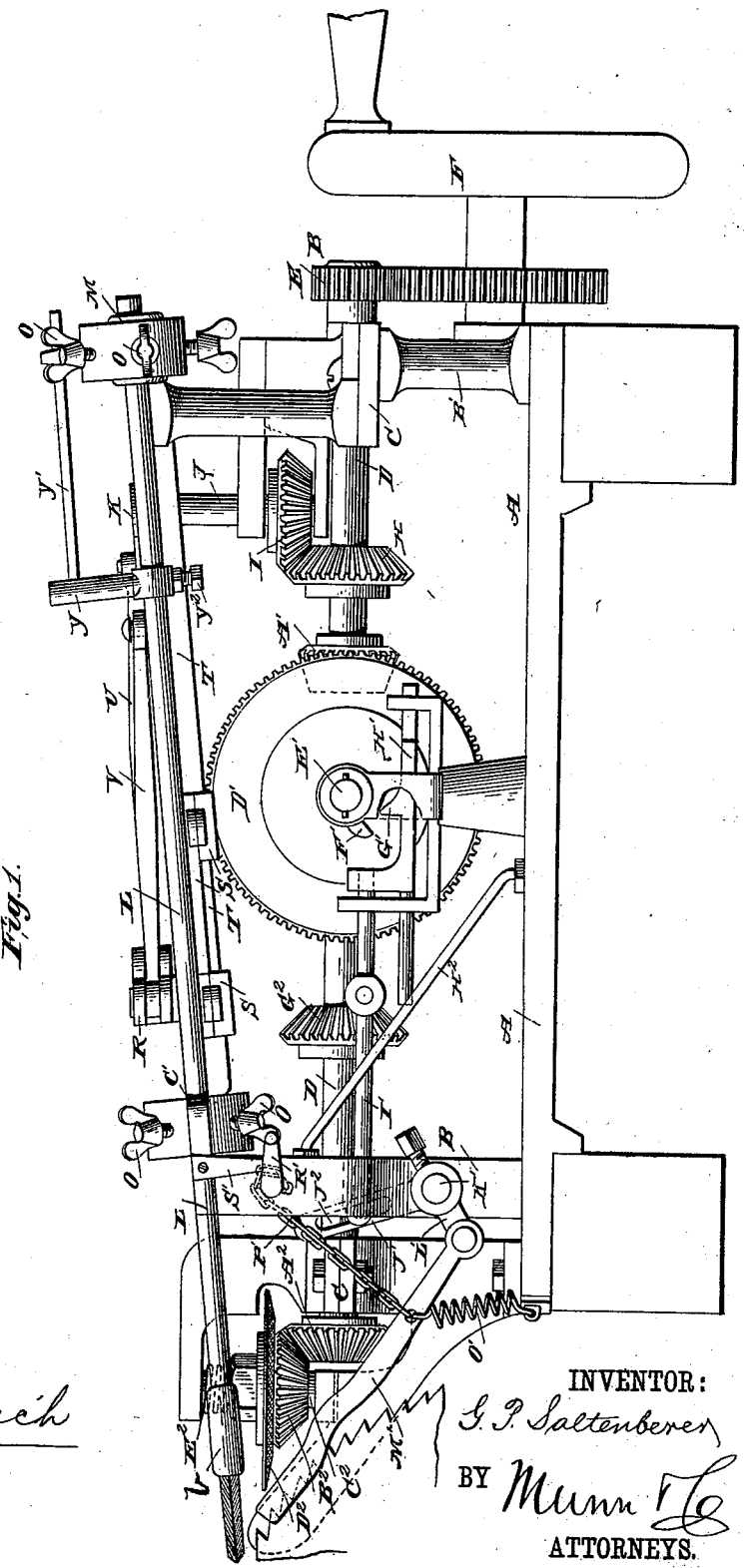
Figure 2:
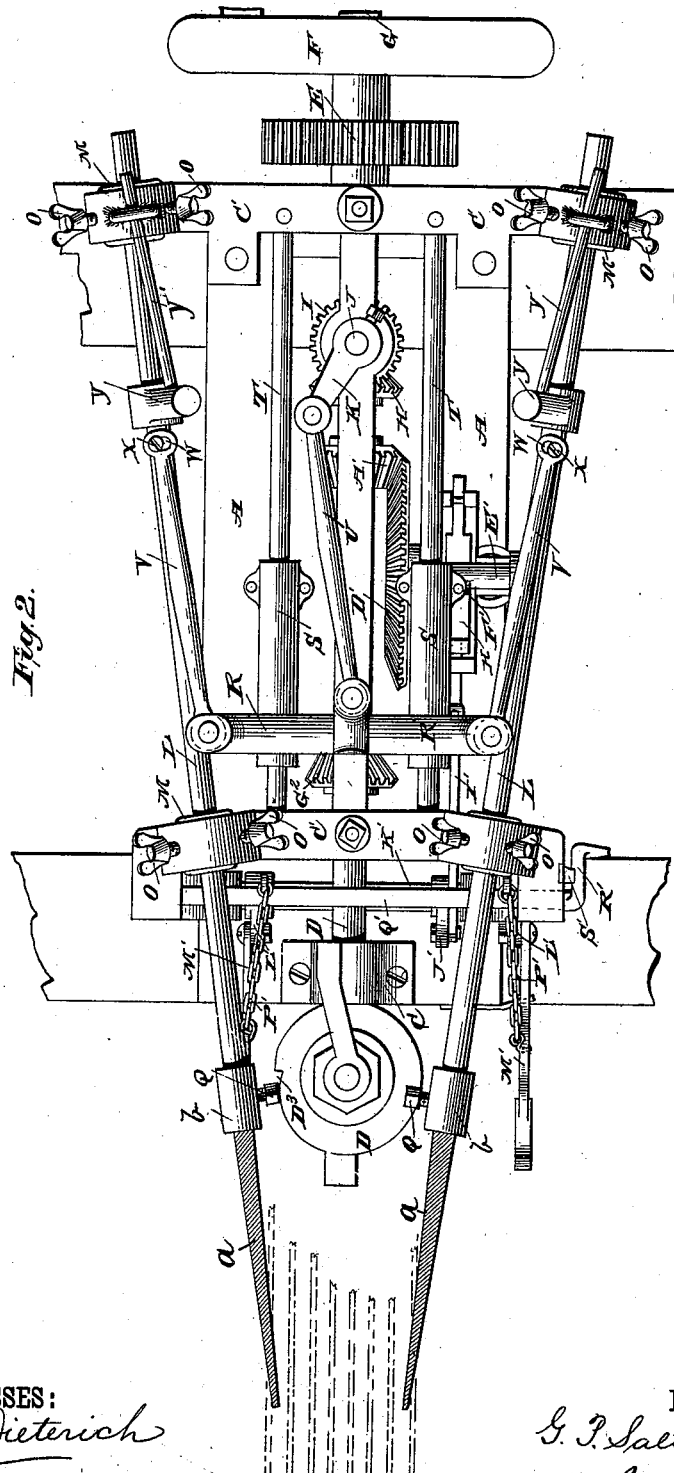

Referring to the accompanying drawings, Figure 1 is a side elevation of my improvement. Fig. 2 is a plan view of the same. Fig. 3 is a plan view, partly broken away and showing it adjusted as a gummer. Figs. 4 and 5 are detail views, partly in section.

The same letters of reference indicate corresponding parts in all the figures.

Referring to the several parts by letter, A indicates the base-plate of my improved machine, which I prefer to have above thirteen inches long by five wide and three-eighths inch thick, the entire machine when made on this scale weighing only about twenty-five pounds.

B B' indicate upright pillars, and C C' cross-pieces, of the stationary frame of the machine. The longitudinal main shaft D turns in bearings in the cross-pieces C, having keyed upon its projecting rear end a gear-wheel, E, which meshes with a similar wheel formed on the sleeve or hub of a large balance-wheel, F, the said balance-wheel and its sleeve and gear-wheel being mounted on a stub-axle, G, which is bolted to the frame of the machine; and it will be seen that when the balance-wheel, which has a handle for convenience in revolving it, is rotated the main shaft D will be thereby revolved.

A bevel-wheel, H, is keyed on the main shaft, near the rear end thereof, and meshes with a bevel-pinion, I, on the lower end of a vertical shaft, J, to the upper projecting end of which is secured an arm, K, for the purpose hereinafter specified.

L L represent the reciprocating file-holders, consisting of rods or bars fitting and sliding in adjustable bearing-blocks M M, which are adjustably secured in openings N in the ends of the upper cross-pieces, C', of the machine-frame, each of said openings being about twice the diameter of the bearing-block, which is adjustably secured therein by means of four adjusting-screws, O, the ends of which fit in a central exterior annular groove or in depressions P, which prevent the blocks from slipping out of the openings N, and it will be seen that by means of these screws the bearing-blocks can be independently adjusted to regulate the angles at which the reciprocating files $a$ operate on the saw-teeth, the said files $a$ being removably secured at their rear ends by set-screws Q in blocks $b$, rigidly secured to the forward ends of the file-holders L L.

R indicates a cross-head formed with guide-sleeves S, which fit and slide upon the parallel rods T of the machine-frame, and the center of this cross-head is pivotally connected by a pitman, U, with the outer end of the arm K, while in the ends of the cross-head are pivoted the forward ends of pitman V, the rear ends of which are formed with transverse oval openings W, through which pass screws X, pivotally securing the said ends to the file-holders, as shown. Immediately to the rear of the said ends are adjustably secured upon the file-holders, by set-screws $Y^2$, short posts or standards Y, having at their upper ends the horizontal guide-rods Y', which extend through vertical slots Z on the cross-piece C' at the rear of the machine-frame.

Upon the main-shaft D, in front of the bevel-wheel H, is keyed a small bevel-wheel, A', adapted to mesh with a large bevel-wheel, D', when the latter is secured on the inner end of a short transverse shaft, E', which is mounted in bearings at about the center of the machine-frame, and is formed with a central lug or projection, F', adapted to come in contact at each revolution of the shaft with an upward projection, G', of a plate or bar, H', which slides in bearings beneath the shaft E', the forward end of this plate H' being pivotally connected, by a pitman, I', with the central slotted arm, J', of a rock-shaft, K', which extends transversely across the front of the machine-frame, and has near its ends the adjustable arms L', to the outer ends of which are pivoted the lower ends of feed-arms M', the upper ends of which are formed on their outer operative faces with a series of upwardly-inclined teeth, N', the feed-arms being held down in contact with the saws by springs O', and connected by chains P' with a transverse rod, Q', having at one end a crank, R', which comes in contact with a stop, S', and thus prevents the feed-arms being drawn down too far by the springs O'.

In operation the machine is placed on a frame or trestles and the saw-cylinder to be sharpened is swung on pivotal bearings immediately in front of the machine, so that the operative ends of the feed-arms rest upon and engage with the teeth of the saws, as shown, and the cylinder can be readily turned. The main shaft is then rotated by revolving the large balance-wheel F, thus revolving the vertical shaft J through the bevel-wheels H I, and through the arm K and pitman U reciprocating the cross-head R back and forth upon the rods T, and through the pitmen V reciprocating the file-holders, and thus steadily, rapidly, and evenly operating the files $a$. As the files are reciprocated back and forth, the standards Y being inclined inward from vertical planes, while the rods Y' thereof pass through vertical slots Z, as described, it will be seen that the file-holders and reciprocating files will be partially rotated or turned as they move back and forth, to enable the files to sharpen the edges of the teeth of the saws. The transverse oval openings W in the rear ends of the pitmen V are for the purpose of permitting this movement of the file-holders. By adjusting the standards Y the amount of rotary movement of the files may be adjusted. As the main shaft is thus revolved, the small bevel-wheel A', meshing with the large bevel-wheel D', rotates the transverse cam-shaft E' one-third as fast as the main shaft, so that when the main shaft has completed three revolutions, reciprocating both straight files together for three strokes, the cam or lug F' comes in contact with the lip G' of the plate H', drawing back the said plate, and through the pitman I' turning the rock-shaft K' to move forward and upward the feed-arms M', thus turning the saws for one tooth, the saws being turned at the moment when the files are drawn back out of contact with the teeth.

The arm J' of the rock-shaft K' is formed with a longitudinal slot, $J^2$, through which the pivot-bolt at the forward end of the pitman I' passes, so that the said pivot-bolt may be raised or lowered to regulate the movement of the feed-arms according to the size of the saws to be sharpened. The balance-wheel is turned to the left when sharpening the saws.

Upon the forward end of the main shaft D is keyed a bevel-pinion, $A^2$, which meshes with a bevel-pinion, $B^2$, keyed on a vertical shaft, $C^2$, and a circular file, $D^2$, is mounted on this shaft above the pinion $B^2$, resting on the same, a spiral spring, $E^2$, holding the file and bevel-wheel and their shaft $C^2$, which is capable of vertical movement down, so that the bevel-pinions $A^2$ $B^2$ will intermesh. When the machine is to be used as a gummer, the large bevel-wheel D' is removed and replaced by a small bevel-wheel, $F^2$, and a bevel-wheel, $G^2$, of the same size as the wheel $F^2$, is slid back and keyed on the shaft D to engage with the bevel-wheel $F^2$, as shown in Fig. 3 of the drawings. The straight files are then removed from the file-holders, and the pitman U is removed to separate the vertical shaft J from the cross-head R, leaving the file-holders at rest. When the balance-wheel is rotated to the right, the circular file $D^2$ is revolved in the direction indicated by the arrow in Fig. 3, rapidly and effectively gumming the tooth on which it is operating, and at the same time the transverse shaft E' is rotated, turning once for each revolution of the main shaft and circular file, (as the bevel-wheels $F^2$, $G^2$, $A^2$, and $B^2$ are all of the same size,) and thus turning the saws forward for one tooth, in the manner previously described, at the end of each revolution of the circular file; and the circular file has a segment of its periphery cut away, as shown at $D^3$, so that the saw-teeth are clear of the file at the moment that the feed-arms turn the saws, the cutting-edge or periphery of the gummer-file being in the form of a spiral—that is, the said file increases in diameter from the point $D^3$, as shown—that is, from its first point of contact until its periphery is clear of the saw-tooth at $D^3$—as will be clearly seen. By this spiral construction of the cutting-edge of the gummer-file I greatly increase the efficiency of its operation.

$H^2$ indicate braces, which strengthen the machine-frame.

From the foregoing description, taken in connection with the accompanying drawings, the construction, operation, and advantages of my invention will be readily understood. It will be seen that it is simple and strong in construction, can be changed in a few moments from a saw-sharpener to a saw-gummer, and is exceedingly rapid and efficient in operation, effecting a great saving in time and labor and performing its work in a superior manner. It will also be seen that the reciprocating files operate simultaneously, and are drawn back out of contact with the saw-teeth at the moment when the saws are being turned, and are thereby prevented from bending or otherwise injuring the teeth, the circular file being also clear of the saw-teeth when the saws are being turned, as described.

Having thus described my invention, what I claim as new is—

1. The gummer-file formed with the spiral cutting-edge, substantially as and for the purpose set forth.

2. The combination of the vertical shaft having the crank-arm, means, substantially as described, for rotating the same, the reciprocating file-holders carrying the straight files, the adjustable standards having the guide-rods passing through the vertical slots of the machine-frame, the reciprocating cross-head, the pitmen connecting the cross-head to the file-holders, and having the transverse oval openings in their rear ends, and the pitman connecting the cross-head to the crank of the vertical shaft.

3. The combination, with the reciprocating file-holders, of the adjustable bearing-blocks through which the said holders pass, the cross-pieces having the openings of greater diameter than the blocks in which the said blocks are secured, and the adjusting-screws.

4. The combination of the vertical shaft having the crank-arm at its upper end, and having the bevel-wheel at its lower end, the transverse shaft formed with the central projection, and having the large bevel-wheel on its inner end, the drive-shaft having the bevel-wheels H and A', the reciprocating file-holders carrying the straight files, the adjustable standard having the guide-rods passing through the vertical slots of the machine-frame, the reciprocating cross-head, the pitmen connecting the cross-head to the file-holders, and having the transverse oval openings in their rear ends, the pitman connecting the cross-head to the crank of the vertical shaft, the rock-shaft having the spring-actuated feed-arms pivoted to two of its arms, the sliding plate having the upwardly-projecting lip, and the pitman connecting the said plate to the middle arm of the rock-shaft.

5. The combination of the rock-shaft having the slotted inner arm and the adjustable outer arms, the spring-actuated feed-arms pivoted to the said outer arms, means, substantially as described, for limiting the downward movement of the feed-arms, the sliding plate having the upwardly-projecting lip, the pitman connecting the said plate to the slotted arm of the rock-shaft, and the transverse shaft formed with the central projection, and having the removable beveled end wheel adapted to engage with a bevel-wheel on the main drive-shaft.

6. The combination of a longitudinal drive-shaft having a beveled wheel on its forward end, a vertical shaft above said beveled wheel, and provided with a bevel-wheel meshing with the bevel-wheel of the main shaft, and a circular file carried by said vertical shaft, substantially as herein shown and described.

7. The combination, with the main drive-shaft having the bevel-wheel on its forward end, and having the central adjustable bevel-wheel, $G^2$, of the forward vertical shaft having the bevel-wheel on its lower end, the circular file having a segment of its periphery cut away, the transverse shaft having the removable beveled end wheel and formed with the central projection, the sliding plate having the upwardly-projecting lip, the rock-shaft having the inner and outer arms, the spring-actuated feed-arms pivoted to the said arms, and the pitman connecting the said sliding plate to the inner arm of the rock-shaft, substantially as set forth.

8. The combination, with the file-holders and means for reciprocating the same, of inwardly-inclined arms secured upon the file-holders and rods projecting from said arms and working in vertical guide-slots of the frame, substantially as herein shown and described.

9. The combination, with the supporting-frame, the file-holders, and means for reciprocating said holders, of inwardly-inclined standards adjustably secured to the file-holders, rods projecting rearwardly from said standards, and vertical guides in which the rods work on the rear portion of the frame, substantially as herein shown and described.

10. In a saw sharpener and gummer, the file-holders, guides for the same, a reciprocating cross-head, pitmen having one end connected to the cross-head and their other ends loosely connected to the file-holders, and means for reciprocating the cross-head, in combination with inwardly-inclined arms upon the file-holders and rods projecting from the said arms and working in guide-slots of the frame, substantially as herein shown and described.

11. In a saw sharpener and gummer, the file-holders provided with projections, guides for the said holders, a reciprocating cross-head, pitmen pivoted to the ends of the cross-head, and having their opposite ends provided with transverse slots to receive the projections on the file-holders, and means for reciprocating said cross-head, in combination with inwardly-inclined arms adjustably secured to the file-holders, rearwardly-projecting rods, and guides on the frame in which the said rods work, substantially as herein shown and described.

12. In a saw sharpener and gummer, the combination, with the shaft E', provided with the cam F', and means for operating said shaft, of a rock-shaft, a feed-arm connected to an arm of said rock-shaft, a slide arranged below the cam-shaft and provided with a projection for engaging the cam, and a pitman connecting the slide to an arm of the rock-shaft, substantially as herein shown and described.

13. In a saw sharpener and gummer, the combination, with the frame, the rock-shaft K', a feed-arm pivoted to an arm of the rock-shaft, and means for operating said rock-shaft, of a spring connected to said feed-arm and frame, a shaft journaled above the rock-shaft, a chain connected to said shaft and feed-arm, and means for locking the shaft to which the chain is attached, substantially as herein shown and described.

14. In a saw sharpener and gummer, the combination of the main shaft D, provided with the gear-wheels A' $G^2$, and the interchangeable gear-wheels D' $F^2$, substantially as herein shown and described.

GEORGE P. SALTENBERER.

Witnesses:
L. W. PERDUE,
J. S. ROLFE.